United States Patent [19]
Alexy, Jr. et al.

[11] Patent Number: 5,808,191
[45] Date of Patent: Sep. 15, 1998

[54] WELL LOGGING INSTRUMENT STRING HAVING FLEXIBLY COUPLED SEGMENTS AND A SELECTABLY OPERABLE FLEXIBLE COUPLING THEREFOR

[75] Inventors: Albert A. Alexy, Jr., Katy; Arnold M. Walkow, Houston; Randy Gold, Houston; James E. Brewer, Houston, all of Tex.

[73] Assignee: Western Atlas International, Inc., Houston, Tex.

[21] Appl. No.: 924,067

[22] Filed: Aug. 28, 1997

[51] Int. Cl.⁶ .............................. G01V 3/20; G01V 1/40; G01B 7/12
[52] U.S. Cl. ................................ 73/152.03; 73/152.54; 166/250; 166/100; 175/45; 175/50
[58] Field of Search .......................... 73/152.03, 152.17, 73/152.54; 166/100, 117.5, 250; 175/77–78, 45, 50

[56] References Cited

U.S. PATENT DOCUMENTS

| | | | |
|---|---|---|---|
| 3,237,093 | 2/1966 | Bennett et al. | 324/1 |
| 3,356,146 | 12/1967 | Anderson | 166/241 |
| 3,654,470 | 4/1972 | Wilson | 250/83.6 W |
| 4,120,353 | 10/1978 | Roesner | 166/65 R |
| 4,416,151 | 11/1983 | Ullo | 73/152 |
| 4,432,143 | 2/1984 | Moriarty et al. | 33/178 F |
| 4,614,250 | 9/1986 | Panetta et al. | 181/102 |
| 4,716,973 | 1/1988 | Cobern | 175/50 |
| 5,198,770 | 3/1993 | Decorps et al. | 324/367 |
| 5,528,556 | 6/1996 | Seeman et al. | 367/25 |
| 5,596,142 | 1/1997 | Delpuech et al. | 73/152.17 |

FOREIGN PATENT DOCUMENTS 2239881  7/1991  United Kingdom .

Primary Examiner—Hezron E. Williams
Assistant Examiner—J. David Wiggins
Attorney, Agent, or Firm—Richard A. Fagin

[57] ABSTRACT

A well logging instrument string including a first section adapted to be operated substantially in contact with a wall of a wellbore, a coupling connected at one end to one end of the first section. The coupling includes first and second flexible joints for enabling relative angular deflection between the first section and a second section. The coupling includes a biasing mechanism for urging at least one of either the first or the second flexible joints, or both, to assume their positions of maximum angular deflection. The instrument string includes a second section connected to the other end of the coupling. The second section is adapted to be operated spaced apart from the wellbore wall.

18 Claims, 4 Drawing Sheets

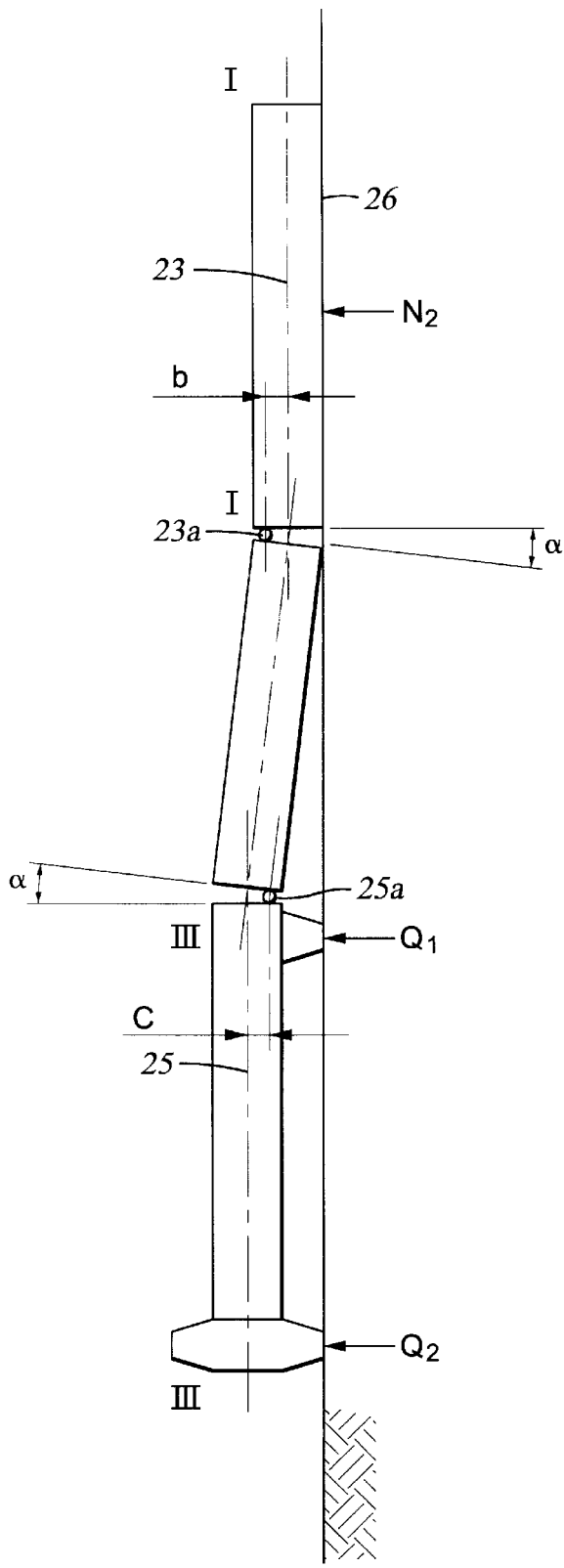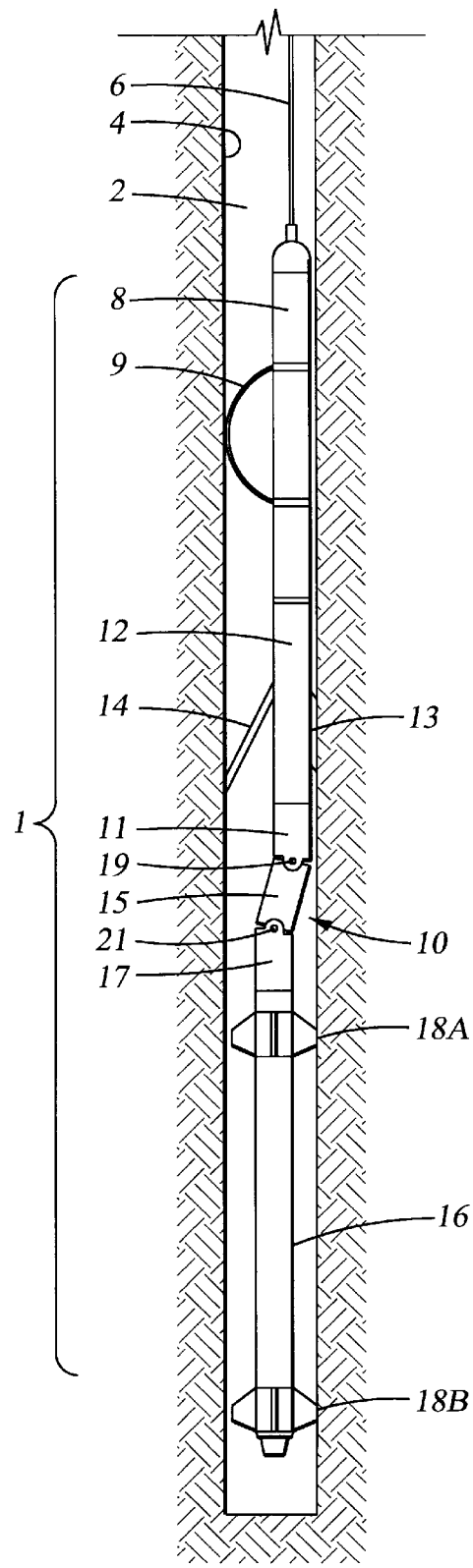
*Fig. 1*
(PRIOR ART)
*Fig. 2*

WELL LOGGING INSTRUMENT STRING HAVING FLEXIBLY COUPLED SEGMENTS AND A SELECTABLY OPERABLE FLEXIBLE COUPLING THEREFOR

BACKGROUND OF THE INVENTION

1. Field of the Invention

The invention is related to the field of well logging instrumentation used in wellbores drilled through earth formations. More specifically, the invention is related to arrangements of well logging instruments which provide proper radial positioning of logging sensors with respect to the walls of wellbores, particularly in those wellbores which are not drilled vertically through earth formations.

2. Description of the Related Art

Well logging instruments are used to make measurements of physical properties of earth formations from within wellbores drilled through these formations. Some of these instruments, such as neutron porosity measuring devices, make more precise measurements when placed into contact with the wall of the wellbore. Other types of well logging instruments, such as electromagnetic induction resistivity measuring devices, make more precise measurements when radially spaced apart from the wellbore wall by a predetermined distance. Still other types of well logging devices include small sensors which may be placed in contact with the wellbore wall over only a small portion of the circumference of the wellbore wall and over a very short axial length along the wall. These small sensors are generally placed in devices referred to as "pads", which selectably extend from the instrument housing to contact the wellbore wall. Common types of "pad" sensor logging instruments include "backscatter"-type gamma-gamma density sensors and various forms of very small-scale, or "micro", resistivity devices. As is known in the art, a pad mounted sensor usually includes various linkages for causing the pad to selectably extend from the main housing of the logging instrument which place the pad in firm contact with the wall of the wellbore.

It is generally desirable, for reasons of economy of operation, to assemble as many different types of well logging sensors as is practical together in a single instrument assembly (called a "string") so that many different types of measurements can be made in a single operation of the instrument string in the wellbore. As more logging sensors are assembled in the instrument string, operating the string becomes increasingly difficult, particularly because some of the instruments can be pad-type, others can be intended to be put in contact with the wellbore wall, and still others on the same string need to be separated from the wellbore wall. Conventional logging instruments typically are long enough so that natural flexibility in the instrument housings enables the different types of instruments to be placed in their proper radial positions with respect to the wellbore wall. If conventional logging instruments are used, however, the overall length of the instrument string can become so great as to materially increase the risk of the instrument string becoming stuck in the wellbore, among other hazards.

One attempt to overcome the limitations of assembling a large number of different sensors in an instrument string is described in U.S. Pat. Nos. 5,596,142 and 5,528,556 issued to Delpuech et al. An instrument string disclosed in these patents includes three "segments" connected to each other by hinges which are offset from the central axis of the instrument string. The purpose of the offset hinges is to enable the uppermost segment of the string to be placed in contact with the wellbore wall substantially parallel to the wellbore wall, while at the same time enabling the, lowermost segment to be radially spaced away ("stood off") from the wellbore wall. The center segment includes a pad mounted sensor which is configured to be placed in contact with the wellbore wall even while the central segment is axially oriented out of parallel with the wall of the wellbore. By flexibly joining the segments together, it is possible to substantially reduce the overall length of the instrument string while enabling the individual sensors to be placed in their proper radial positions with respect to the wellbore wall.

A drawback to the instrument string described in the Delpuech et al '142 and '556 patents is that it has a tendency to become lodged in wellbores drilled at highly inclined angles from vertical. Referring to FIG. 1 (which is substantially identical to Delpuech '142 FIG. 2), the lowermost segment III is connected to the central segment (no reference numeral in Delpuech '142 FIG. 2) by a hinge 25a which is axially offset to one side of the instrument string. Gravity generally causes the lowermost segment III normally to point downwardly by deflection about the pivot 25a because the pivot 25a is offset from the central axis of the instrument string. If the wellbore is drilled highly inclined from vertical, gravity causes the lowermost segment III to deflect axially so that its lowermost end (shown near reference numeral Q2) will be directed towards the lowermost wall of the wellbore. This can cause the instrument string to become lodged in the wellbore wall and unable to be moved further into the wellbore by gravity.

Another limitation of the instrument string shown in the Delpuech et al '142 patent is that the center segment II includes an extensible pad mounted sensor. Because the center segment II can be substantially out of parallel with respect to the wellbore wall, the extensible pad mounted sensor can be extended a substantial distance from the main body of the center segment II. Such extension increases the risk of damage to linkages connected the pad mounted sensor to the center segment II.

Still another limitation to the instrument string shown in the Delpuech patents is that they require the radially separated segment to be placed at the bottom of the instrument string. The uppermost segment of the string is generally the one which is intended to be placed in contact with the wellbore wall. In cases where the wellbore is highly inclined, withdrawing the instrument string from the wellbore by an attached armored cable (the "logging cable") can cause the housing of the uppermost segment to be "lifted" away from the wellbore wall because there is typically a component of tension on the logging cable which is normal to the axis of the instrument string when the wellbore is inclined from vertical. Keeping the uppermost segment of the instrument string in contact with the wellbore wall in the presence of the normal force component on the logging cable can require such a large amount of force on an eccentralizing device so as to materially increase the risk that the instrument string will become lodged in the wellbore.

Another type of well logging instrument including a flexible coupling is shown in U.S. Pat. No. 4,614,250 issued to Panetta et al. The instrument in the Panetta et al '250 patent includes a single flexible joint which connects a "sonde" section to a "cartridge" section in the instrument. The purpose of the flexible coupling recited by Panetta et al is to remove the weight of the cartridge section from linkages used for extending pad mounted sensors in the sonde section. By removing the weight of the cartridge section, the extending linkages can be designed to keep the pad mounted sensors in contact with the wellbore wall using less overall force. The logging instrument shown in the Panetta et al '250 patent is not suitable for use with well logging instruments intended to be spaced apart from the wellbore wall, however. As can be clearly seen in FIG. 1 of the Panetta et al patent, the flexible coupling provides the sonde section with an inclined orientation with respect to the wellbore wall. The uppermost portion of the sonde section of the instrument is still in contact with the wellbore wall. Such contact is undesirable when using certain sensor types such as electromagnetic induction sensors or acoustic sensors in the instrument string. If the sensor is one which is intended to be centered in the wellbore, the difficulty of using the single-jointed instrument string shown in the Panetta et al '250 patent becomes markedly worse, since centralizing the one sensor section of the instrument string necessarily provides that the other section of the instrument string will be out of parallel with the wellbore wall. If this other section of the string is a neutron porosity sensor or similar, for example, its measurements are likely to be made less precise if it is caused to be moved out of parallel contact with the wellbore wall.

What is needed is an instrument string which retains the beneficial features, primarily shorter overall length, of the instrument string disclosed in the Delpuech et al '142 and '556 patents, but does not have a tendency to become lodged in highly inclined wellbores, and provides the capability for certain sensors such as induction or acoustic sensors to be operated radially spaced apart from but substantially parallel to the wellbore wall.

SUMMARY OF THE INVENTION

The invention is a well logging instrument string including a first section adapted to be operated substantially in contact with a wall of a wellbore, which has a doubly jointed flexible coupling connected at one end to one end of the first section. The coupling includes first and second flexible joints. The coupling includes a biasing mechanism for urging at least one of either the first or the second flexible joints, or both, to their maximum angular deflection. The instrument string includes a second section connected to the other end of the coupling. The second section is adapted to be operated spaced apart from the wellbore wall.

In one embodiment of the invention, the biasing mechanism for urging the flexible joint to its maximum angular deflection includes another mechanism for selectably returning the flexible joint to assume its position of minimum angular deflection.

A particular embodiment of the invention includes neutron porosity and density sensors in the first section and an electromagnetic induction resistivity sensor in the second section.

BRIEF DESCRIPTION OF THE DRAWINGS

FIG. 1 shows a prior art logging instrument string including flexible couplings for enabling one sensor to contact the wellbore wall while another sensor is separated from the wellbore wall.

FIG. 2 shows a logging instrument string using a flexible coupling according to the invention.

DESCRIPTION OF THE PREFERRED EMBODIMENT

Figure 3:
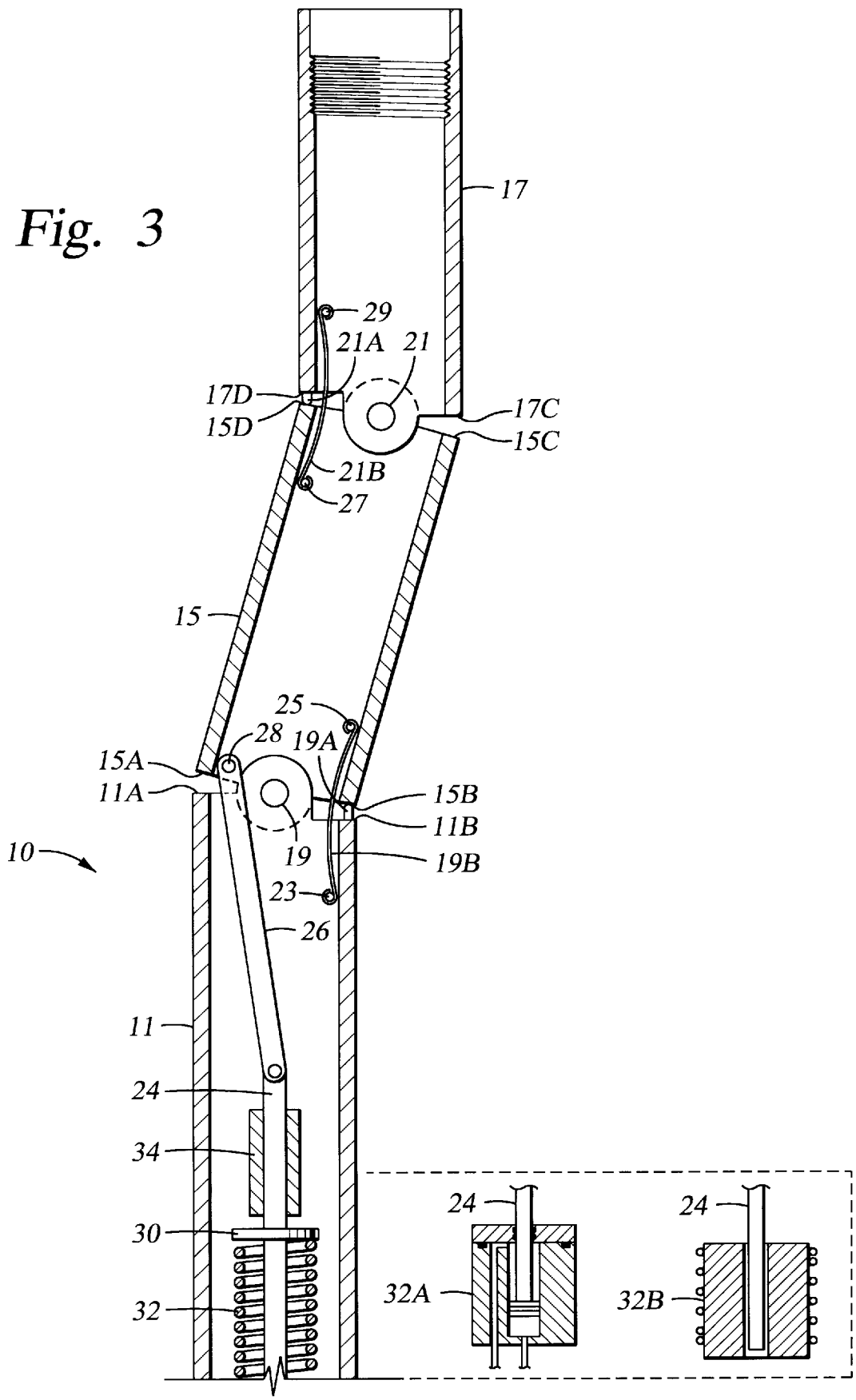
FIG. 3 shows the flexible coupling of the invention in more detail.

The invention can be better understood by referring to FIG. 2. A wellbore 2 is shown drilled through earth formations (not shown). At one end of an armored electrical cable 6, a well logging instrument string 1 (the components of which will be further explained) is inserted into the wellbore 2. The well logging instrument string 1 generally is caused to move downwardly through the wellbore 2 by gravity as the cable 6 is extended into the wellbore 2. Means for extending and retracting the cable 6 from the wellbore 4 are well known in the art.

The instrument string 1 includes various sensors that are each intended to be operated from within the wellbore 2 at a predetermined radial position with respect to the wall 4 of the wellbore 2. For example, a compensated neutron porosity sensor, shown generally at 8, may be located in the uppermost position on the instrument string 1. As is known in the art, the neutron porosity sensor 8 is preferably operated with one side of its housing in substantially parallel contact with the wellbore wall 4. Contact with the wellbore wall 4 can be effected by a bowspring 9 or any other eccentralizing device known in the art. A formation density sensor 12 can be included in the instrument string 1 below the neutron porosity sensor 8. The density sensor 12 can be of any type known in the art. Typically the density sensor 12 includes a pad section 13 which contains radiation detectors (not shown separately) and which is adapted to be placed in contact with the wellbore wall 4. Generally the pad section 13 is located so that it contacts the wellbore wall 4 within about the same relative sector of the circumference of the wellbore wall as does the compensated neutron porosity sensor 8. The density sensor 12 typically includes various linkages (not shown) which cause the pad section 13 to be placed in contact with the wellbore wall 4 in reaction to force exerted by a back-up arm 14 applied to the opposite side of the wellbore wall 4. Such linkages are well known in the art. Individually or in combination the neutron 8 and density 12 sensors, and/or any other sensor which is to be operated substantially in contact with the wellbore wall 4, form a first "section" of the instrument string.

The lowermost section of the instrument string 1 can include a sensor such as an electromagnetic induction resistivity sensor 16. As is known in the art, electromagnetic induction resistivity sensors are preferably operated in a position radially separated from the wellbore wall 4. This can be effected using well known devices such as "standoffs", shown generally at 18A and 18B. As will be further explained, in the invention the induction sensor 16 need not be located in the lowermost position of the instrument string 1. The configuration shown in FIG. 2 is meant to serve only as an example of possible instrument string configurations using a coupling 10 according to this invention. The coupling 10 will be further explained. It is also to be understood that the sensor in the instrument string 1 which is to be radially separated from the wellbore wall 4 is not limited to electromagnetic induction sensors. The sensor separated from the wellbore wall 4 may also be any other type of sensor intended either to be radially separated from the wellbore wall or to be generally centered in the wellbore 2. Examples of the latter type of sensor include acoustic velocity sensors and acoustic pulse echo imaging sensors. Individually or in combination, sensors intended to be operated spaced apart from the wellbore wall form a second "section" of the instrument string 1.

Again referring to FIG. 2, the induction resistivity sensor 16 (or any other sensor in the second "section") can be interconnected to the density sensor 12 (or any other sensor in the first "section") through the doubly-jointed coupling, shown generally at 10. In one embodiment of the invention, the coupling 10 can include an upper section 11 connected through an upper hinge 19 to a center section 15, and can include a lower section 17 connected through a lower hinge 21 to the center section 15. When hinges are used in the coupling 10, the upper 19 and the lower 21 hinges should have pivot axes which are generally located substantially along the axis of the upper 11 and center 15 sections, and substantially along the center 15 and lower sections 17, respectively. The axes of the hinges 19, 21 should generally be parallel to each other, and substantially perpendicular to a line connecting the center of the first "section" of the string 1 to a line of contact between the sensors in the first "section" and the wall of the wellbore 4. The coupling 10 will be explained in more detail, but it should be noted here that the coupling 10 enables the induction resistivity sensor 16 (or any other sensor in the second "section") to be operated radially separated from the wellbore wall 4 and substantially axially parallel to the wall 4, while the density sensor 12 and the neutron porosity sensor 8 can be placed into contact with the wellbore wall 4. When using the coupling 10 as shown in FIG. 2, it is also possible to assemble the instrument string 1 with the density sensor 12 in the uppermost position of the instrument string 1, and have the neutron porosity sensor 8 positioned between the coupling 10 and the density sensor 12. This configuration of the sensors is not possible using the instrument configuration of the prior art, such as one shown in U.S. Pat. No. 5,528,556 issued to Delpuech, for example. As will also be further explained, it is possible to assemble the instrument string 1 with the induction sensor 16 on the top, and the density 12 and neutron 8 sensors on the bottom using the coupling 10 as shown in FIG. 2.

The coupling 10 is shown in more detail in FIG. 3. The upper section 11, as previously explained, can be coupled to the center section 15 by a hinge 19 or similar flexible coupling having a pivot axis substantially along the central axis of the upper 11 and center 15 sections. The hinge 19 enables the axis of the upper section 11 to deflect with respect to the axis of the center section 15.

The abutting ends 11A, 15A respectively, of the upper 11 and center 15 sections can have lengths with respect to the axis of the hinge 19 so that deflection of the hinge 19 about one direction stops where the center section 15 is substantially axially aligned to the upper section 11. Alternatively, the abutting ends 11A, 15A may have lengths such that a predetermined maximum axial deflection in the direction of the abutting ends 11A, 15A is permitted.

On the ends 11B, 15B respectively opposite (and on the same ends of the upper 11 and center 15 sections) to the abutting ends 11A, 15A, the lengths of the housings of the upper 11 and center 15 sections can be selected relative to the axis of the hinge 19 to enable a predetermined maximum amount of relative axial deflection between the upper 11 and center 15 sections. The maximum amount of the relative axial deflection between the upper 11 and center 15 sections can be selected by an adjustable stop pin 19A. The stop pin 19A can be positioned in either end 11B or end 15B. The stop pin 19A can be a threaded rod, cap screw or similar device which can have its length with respect to the particular housing end changed by the system operator.

A spring 19B, or any other type of biasing device, can be mounted between the upper 11 and center 15 sections to urge the sections 11, 15 into the maximum amount of relative axial rotation. Other types of biasing devices which can be used to cause the required axial deflection can include electrical solenoids, hydraulic cylinders and the like coupled through an appropriate driving mechanism, and example of which will be further explained. The spring 19B is intended to provide axial deflection of the coupling 10 even under a substantial tensile load on the coupling 10. The amount of force applied by the spring 19B should be sufficient to cause the maximum relative axial deflection to take place even with the full weight of the induction sensor (16 in FIG. 1) applied to the lower end of the coupling 10. The spring 19B may be a leaf spring or similar attached to the sections 11, 15 by means of retainer pins 23, 25 or any similar attachment device. The axial deflection provided by the spring reduces the tendency of one sensor to pull the other out of its proper position with respect to the wellbore wall 4 when the weight of the sensors are applied to the coupling. For example, if the lower section 17 is coupled to a sensor which is to be radially spaced apart from the wellbore wall 4, and the upper section is coupled to sensors which are to be placed in contact with the wellbore wall 4 any tendency of the upper section 11 to be "lifted" away from the wellbore wall 4 by "prying" force exerted by the weight of the lowermost sensor will be substantially reduced.

The center section 15 can be joined to the lower section 17 by a hinge 21 which is substantially similar in design and has a rotational axis substantially parallel to the axis of the hinge 19 joining the center 15 and upper 11 sections. Abutting ends 15C, 17C respectively of the center 15 and lower 17 sections are located on the opposite side of the coupling 10 with respect to the abutting ends 15A, 11A. Abutting ends 15C, 17C can have the same length relationship to the axis of hinge 21 as do abutting ends 11A, 15A with respect to hinge 19, so that when the coupling 10 is fully extended (meaning that the hinge 21 is deflected to its limit in one direction), the lower 17 and center 15 sections will be substantially axially parallel. Just as is the case for abutting ends 11A, 15A, abutting ends 15C, 17C may also have somewhat shorter lengths enabling a predetermined amount of axial deflection between the center section 15 and the lower section 17 in the direction of the abutting ends 15C, 17C.

Opposite ends 15D, 17D can have a length relationship with respect to hinge 21 similar to the length relationship of opposite ends 11B and 15B with respect to hinge 19. This enables relative axial deflection between the center 15 and lower 17 sections in a direction opposite to the allowed relative axial deflection between the upper 11 and center 15 sections. Just as for opposite ends 11B, 15B, the maximum amount of relative axial rotation between the center 15 and lower 17 sections can be adjustably limited by an adjustable stop 21A. Also similar to the manner in which the upper 11 and center 15 sections are connected, the lower 17 and center 15 sections can be urged to their maximum relative axial rotation by means of a spring 21B or similar biasing device coupled to the center 15 and lower 17 sections by pins such as the ones shown at 27 and 29. The force exerted by the spring 21B can be about the same as that exerted by spring 19B. If spring 19B (or any other biasing mechanism) is included, it is not also necessary to include spring 21B (or any other biasing mechanism) in the coupling 10, although it may be desirable to build the coupling using both springs 19B, 21B to enable using lower tension springs for each one.

Another aspect of the coupling 10 is a selectively operable mechanism to cause the upper 11 and center 15 sections to be returned to their axially parallel positions when the logging instrument string (not shown separately in FIG. 3) is inserted into the wellbore (2 in FIG. 2). An example of such a mechanism shown in FIG. 3 can include a slidably operated drive rod 24 located within a bearing 34. The drive rod 24 can be moved approximately axially parallel to the upper section 11 by means of an hydraulic cylinder (shown in the center inset at 32A) or a booster spring shown generally at 32. When actuated, the hydraulic cylinder 32 causes the drive rod 24 to retract away from the center section 15. A drive link 26 can connect the drive rod 24 to a drive pin 28 located in the center section 15. When the drive rod 24 is actuated to retract away from the center section 15, the drive pin is pulled so as to cause the center 15 and upper 11 sections to axially deflect to their axially parallel (retracted) position. The hydraulic cylinder 32A may be actuated to cause the drive rod 24 to retract upon command from a control and data recording system (not shown) at the earth's surface. Command, control and recording systems used for this purpose are well known in the art. Another possible mechanism for selectively operating the drive rod 24 can include an electrical solenoid, shown in the lower inset at 32B. When actuated, the solenoid can extend or retract the drive rod 24 to return the upper 11 and center 15 sections to their axially parallel positions. The mechanisms just described are only examples of possible mechanisms for causing the upper 11 and center 15 sections to retract to the axially parallel position and are not meant to limit the invention. Other mechanisms such as a worm gear and ballnut driven by a motor (not shown in FIG. 3) can be used for the selectively operable mechanism.

The selectively operable mechanism is intended to facilitate inserting the instrument string (1 in FIG. 2) into the wellbore (2 in FIG. 2). When inserting the instrument string into the wellbore, the axial deflection provided by the spring 19B may increase the tendency of the instrument string to become lodged in the wall of the wellbore, particularly in the case where the wellbore is highly inclined from vertical. If the selectively operable mechanism is selected to return the coupling 10 to its minimum angular deflection, any tendency of the instrument string to become lodged in the wall of the wellbore during insertion can be reduced. It should be noted here that the selectively operable mechanism may alternatively be connected to cause the hinge 21 between the center 15 and lower 17 sections to be returned to its minimum axial deflection. It is also contemplated that a selectively operable mechanism can be included at each hinge 19, 21.

Figure 4:
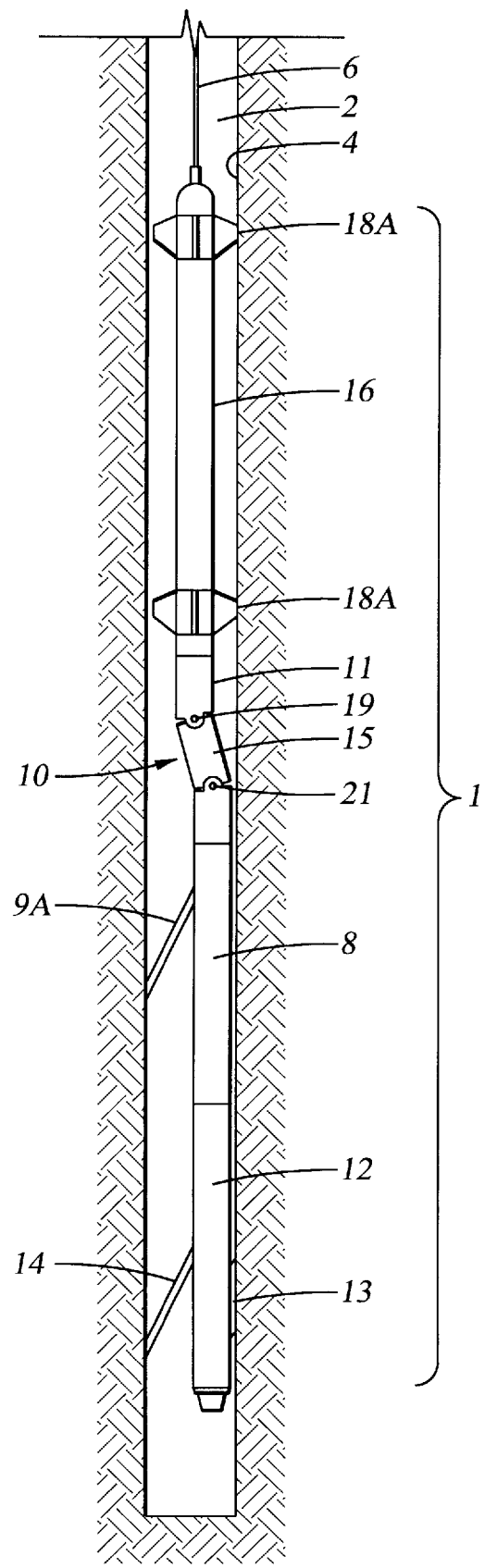
FIG. 4 shows an alternative arrangement of sensors on the instrument string using the flexible coupling of the invention.

An alternative arrangement of the sensors in the instrument string 1 which is made possible by the coupling 10 of this invention is shown in FIG. 4. The sensor which is to be radially spaced apart from the wellbore wall 4 is shown in the uppermost position in the instrument string at 16. As previously explained, this sensor may be an electromagnetic induction sensor separated from the wellbore wall 4 by standoffs 18A, 18B, or may be any other type of instrument intended to be separated form the wall 4 or centralized in the wellbore 2, such as an acoustic velocity sensor or acoustic pulse echo imaging sensor. The coupling 10 is shown in FIG. 4 as being attached to the bottom of the induction sensor 16. The previously referred to neutron 8 and density 12 sensors are shown attached contiguously to the bottom of the coupling 10. As previously explained, the order in which the density 12 and neutron 8 sensors are attached to the coupling is not material to the operation of the instrument string 1. Furthermore, the neutron sensor 8 as shown in FIG. 4 includes a powered back-up arm 9A to cause the neutron sensor 8 to contact the wellbore wall 4. As previously explained, either this type of arm 9A or the previously described bowspring (9 in FIG. 1) can be used to eccenter the neutron sensor 8. It should also be noted that the sensors which are intended to be operated while in contact with the wall 4 are not limited to neutron and density sensors, and accordingly, the placement of these sensors as shown in either FIG. 1 or FIG. 4 is not meant to limit the invention to neutron and density sensors.

It should be noted that the instrument string 1 configured as shown in FIG. 4 has advantages when operated in highly inclined wellbores, because tension on the cable 6 in such wellbores typically includes a force component normal to the axis of the instrument string 1. This normal force tends to cause the uppermost instrument in the string 1 to be pulled away from the lowermost side of wellbore wall 4 as the cable 6 is withdrawn from the wellbore 2. If the instrument string 1 is configured as shown in FIG. 2, it can be readily understood that a larger eccentering force would be needed to keep the neutron 8 (or density 12) sensor in contact with the wellbore wall 4 as a result of this normal force than if the instrument string is configured as shown in FIG. 4. If the instrument string 1 is configured as shown in FIG. 4 however, the normal force will not be transferred through the coupling 10 and so has substantially no effect on the neutron 8 and density 12 sensors if they are positioned below the coupling 10. Fixed standoffs such as shown at 18A and 18B generally can maintain a sufficient amount of radial separation from the wellbore wall 4 for the induction sensor 16 even when the normal force on the cable 6 is very high.

DESCRIPTION OF AN ALTERNATIVE EMBODIMENT

Figure 5:
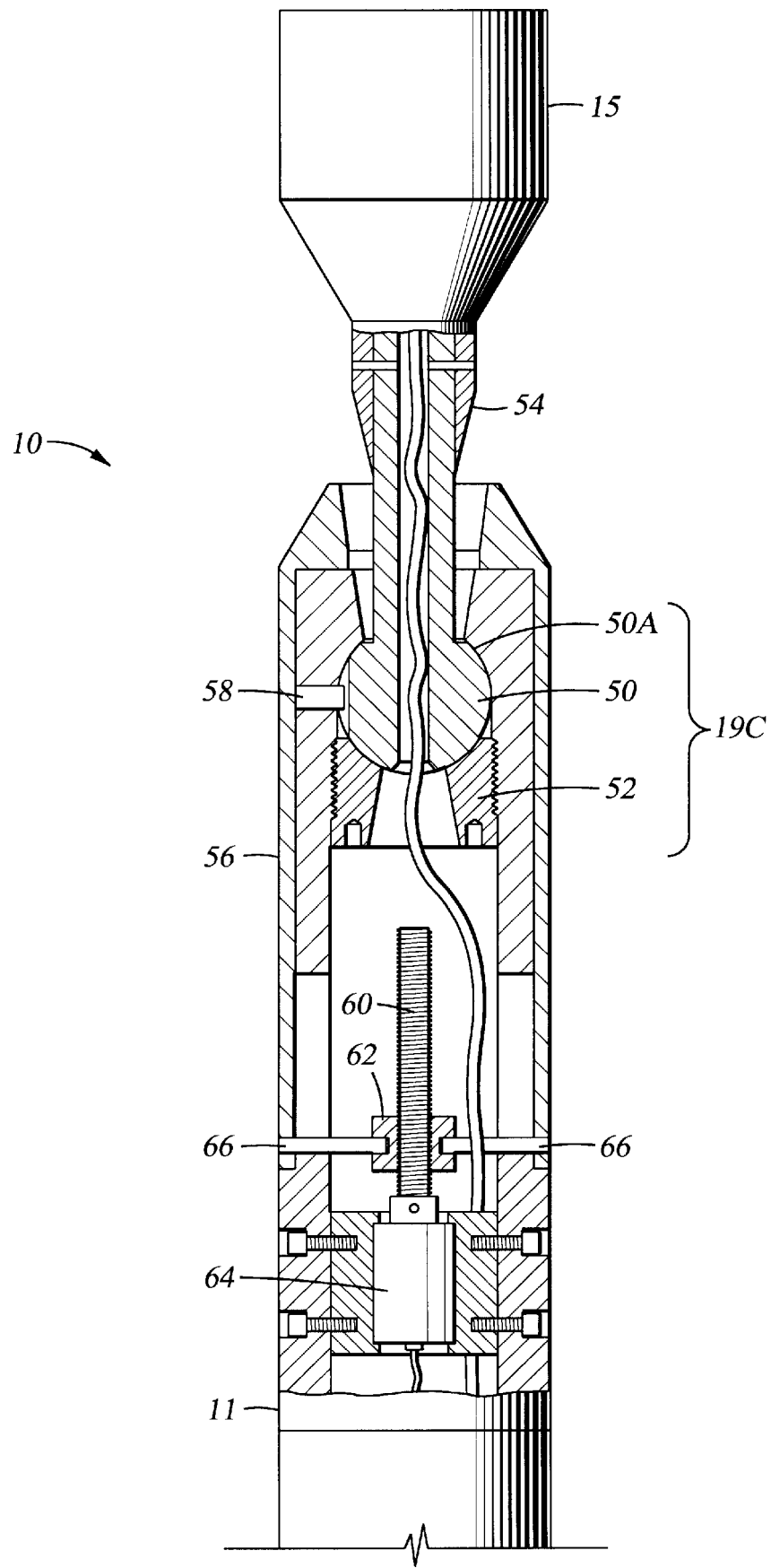
FIG. 5 shows an alternative embodiment of a flexible joint on the coupling of the invention.

FIG. 5 shows an alternative embodiment for a flexible joint 19 as used in the coupling 10 of the invention. The flexible joint 19C in FIG. 5 can be a substitute for the hinge (shown at 19 in FIG. 3). Only part of the coupling 10 comprising the upper section 11 and the center section 15 is shown in FIG. 5 since the arrangement of the flexible joint 19C shown in FIG. 5 can be substantially duplicated in the connection between the center section 15 and the lower section (17 in FIG. 2) to form a complete flexible coupling 10. The joint 19C can be a spherical joint, or ball 50, and a socket 50A formed into the upper section 11 housing. The ball 50 can be retained in the socket 50A by a capture nut 52 or similar device. An anti rotation-pin 58 allows the ball 50 to move to any relative deflection angle within a cone of travel, but prevents rotation of the ball 50 about its axis relative to the axis of the upper section 11. It should be noted that a splined ball and socket could be used instead of the smooth ball 50 and anti rotation pin 58 shown in FIG. 5 to prevent axial rotation about the axis of the joint 19C. The ball 50 can be directly connected to the center section 15 so that the upper 11 and center 15 sections are substantially prevented from axial rotation with respect to each other, but can have any axial deflection within the cone of travel of the ball 50 in the socket 50A.

If the ball 50 and socket 50A is used for the flexible joint 19C, an alternative mechanism for selectively returning the upper 11 and center 15 sections to substantially axially parallel orientation can be used for this flexible joint 19C. The alternative mechanism can include a capture sleeve 56 slidably disposed on the lower end of the upper section 11. The sleeve 56 is adapted to engage a capture cone 54 formed into the upper portion of the center section 15 (or on the stud portion of the ball 50 as shown in FIG. 5). The capture sleeve 56 can slide along the outside of the upper section 11 towards or away from the center section 15. The capture sleeve 56 can be moved by any number of mechanisms, including as shown in FIG. 5, a motor/geartrain 64 which can be selectively operated by the system operator to cause the axial movement of a drivenut 62 or similar. The drivenut 62 can engage the capture sleeve 56 through drive pins 66 or the like. When the motor 64 is operated to move the drivenut 62 towards the center section 15, the drive pins 66 push the capture sleeve 56 along the upper section 11 until it contacts the capture cone 54. As the capture sleeve 56 is pushed further onto the capture cone 54, the center section 15 is caused to move into axial alignment with the upper section 11. When the capture sleeve 56 is fully engaged with the capture cone 54, the center section 15 and the upper section 11 are prevented from any substantial axial deflection between them. Other types of mechanisms for actuating the capture sleeve 56, such as hydraulic cylinders or the like may be used. The motor/geartrain 64 is only shown as one example of such a mechanism.

It should also be noted that the connection between the upper 11 and center 15 sections need not be of the same type as the connection between the center 15 and lower (17 in FIG. 3) sections. For example, the connection between the upper 11 and center 15 sections can be include the ball 50 and socket 50A as shown in FIG. 5, while the connection between the center 15 and lower (17 in FIG. 3) sections can be hinge (as shown in FIG. 3 at 21). The opposite configuration may also be used, where the locations of the ball and socket, and the hinge, are reversed with respect to the upper 11 and lower (17 in FIG. 3) sections.

It should also be noted that the locations of the capture cone 54 and capture sleeve 56 are a matter of convenience for the system designed and are not meant to limit the invention. For example, the capture cone 54 and the ball 50 could form part of the upper section (11 in FIG. 5), while the capture sleeve 56 and its selectably operable mechanism could form part of the center section 15.

Those skilled in the art will devise other embodiments of the invention which do not depart from the spirit of the invention as disclosed herein. Accordingly, the scope of the invention should be limited only by the attached claims.

What is claimed is:

1. A well logging instrument string, comprising:
   a first section having a first well logging sensor therein adapted to be operated substantially in contact with a wall of a wellbore; and
   a coupling connected at a first end to one end of said first section, said coupling including first and second flexible joints for enabling relative angular deflection between said first second and a second section, said first joint having a center of rotation substantially coaxial with said first section, said second joint having a center of rotation substantial coaxial with said second section, said second section having a second logging sensor therein adapted to be operated spaced apart from said wellbore wall, said second section coupled at one end to a second end of said coupling, said coupling including at least one biasing mechanism for urging at least one of said first and said second flexible joints to its maximum angular deflection.

2. The instrument string as defined in claim 1 wherein said coupling includes at least one selectably operable mechanism to return said at least one of said first and said second flexible joints having said biasing mechanism to assume its position of minimum angular deflection.

3. The instrument string as defined in claim 2 wherein said selectably operable mechanism comprises an hydraulic cylinder.

4. The instrument string as defined in claim 2 wherein said selectably operable mechanism comprises and electrical solenoid.

5. The instrument string as defined in claim 1 wherein said flexible joints comprise substantially axially parallel hinges.

6. The instrument string as defined in claim 1 wherein at least one of said flexible joints comprises a pinned spherical joint.

7. The instrument string as defined in claim 6 wherein said selectively operable mechanism comprises a selectively operable capture sleeve and a capture cone to return said spherical joint to a minimum axial deflection.

8. The instrument string as defined in claim 1 wherein said first section comprises a neutron porosity sensor and a density sensor.

9. The instrument string as defined in claim 1 wherein said second section comprises an electromagnetic induction resistivity sensor.

10. A flexible coupling for joining a first section and a second section of a well logging instrument string, said first section having a first logging sensor therein adapted to be placed in contact with a wall of a wellbore, said second section having a second logging sensor therein adapted to be spaced apart from said wall, the coupling comprising:
    a first and a second flexible joint, said first joint interconnecting said first section of said string and a center section of said coupling, said second joint interconnecting said center section and said second section of said string, said first joint having a center of rotation substantially coaxial with said first section, said second joint having a center of rotation substantially coaxial with said second section, said first and second joint for enabling relative angular deflection between said first and second sections; and
    a biasing mechanism for urging at least one of said first and said second flexible joints to its maximum angular deflection.

11. The flexible coupling as defined in claim 10 further comprising at least one selectably operable mechanism to return said at least one of said first and said second flexible joints having said biasing mechanism to its position of minimum angular deflection.

12. The flexible coupling as defined in claim 11 wherein said selectably operable mechanism comprises an hydraulic cylinder.

13. The flexible coupling as defined in claim 11 wherein said selectably operable mechanism comprises an electrical solenoid.

14. The flexible coupling as defined in claim 10 wherein said flexible joints comprise substantially axially parallel hinges.

15. The flexible coupling as defined in claim 10 wherein at least one of said flexible joints comprises a pinned spherical joint.

16. The flexible coupling as defined in claim 15 wherein said selectively operable mechanism comprises a capture sleeve for engaging a capture cone to return said spherical joint to its position of minimum axial deflection.

17. A flexible coupling for joining a first section and a second section of a well logging instrument string, said first section adapted to placed in contact with a wall of a wellbore, said second section adapted to be spaced apart from said wall, comprising:
    a first and a second flexible joint for enabling relative angular deflection between said first section and said second section, said first joint interconnecting said first section of said string and a center section of said coupling, said second joint interconnecting said center section and said second section of said string;

a biasing mechanism for urging at least one of said first and said second flexible joints to its maximum angular deflection; and at least one selectably operable mechanism to return said at least one of said first and said second flexible joints having said biasing mechanism to a position of minimum angular deflection, said selectably operable mechanism comprising selectively operable capture sleeve and a capture cone.

18. A flexible coupling for joining a first section and a second section of a well logging instrument string, said first section adapted to be placed in contact with a wall of a wellbore, said second section adapted to be spaced apart from said wall, comprising:

a first and a second flexible joint for enabling relative angular deflection between said first section and said second section, said first joint interconnecting said first section of said string and a center section of said coupling, said second joint interconnecting said center section and said second section of said string;

a biasing mechanism for urging at least one of said first and said second flexible joints to its maximum angular deflection; and at least one selectably operable mechanism to return said at least one of said first and said second flexible joints having said biasing mechanism to a position of minimum angular deflection, said selectably operable mechanism comprising an electrical solenoid.

* * * * *